Oct. 22, 1963  G. L. ADAMS ETAL  3,107,741
MACHINES FOR SIMULTANEOUSLY DRILLING AND INSERTING PIPE LINES
Filed March 29, 1960  2 Sheets-Sheet 1
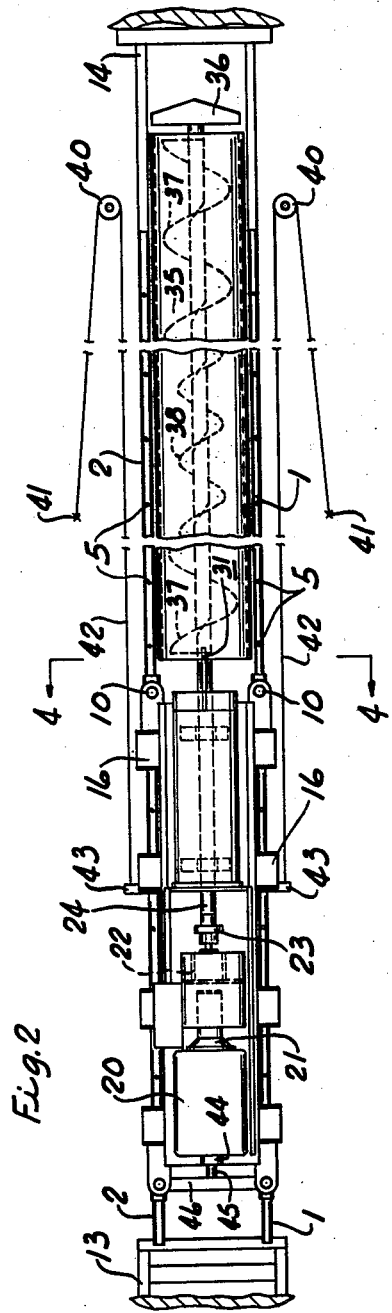
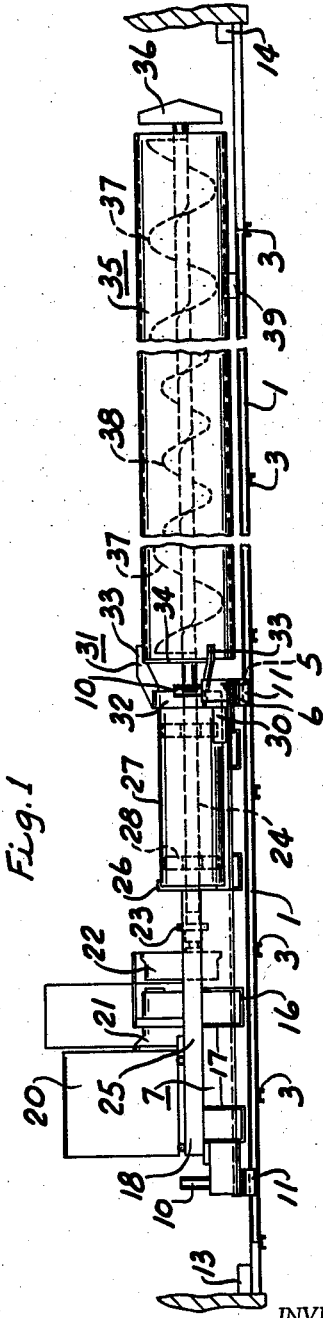
INVENTORS
GEORGE L. ADAMS &
CHARLES T. GOVIN
BY
THEIR ATTORNEY

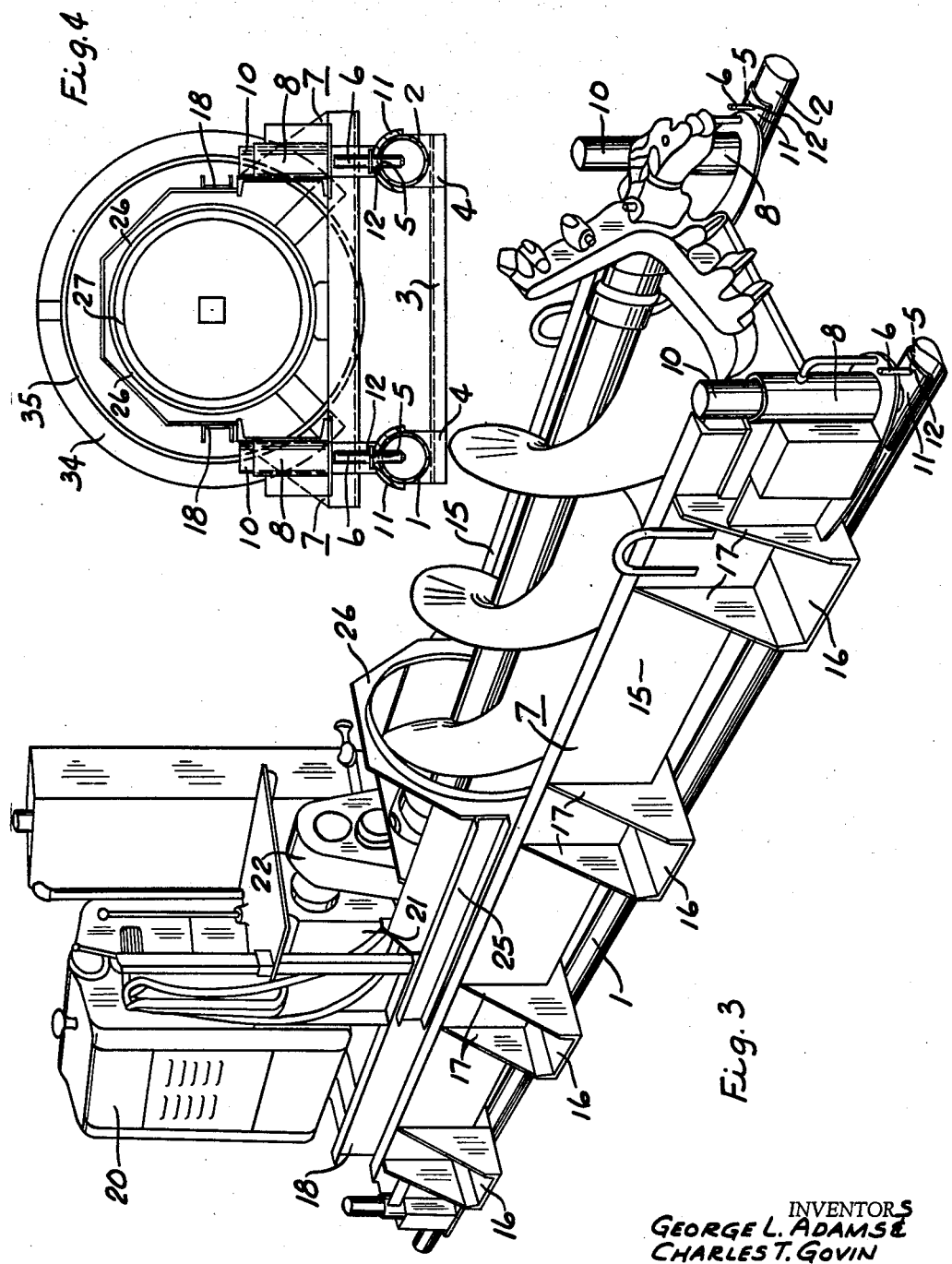

United States Patent Office 3,107,741
Patented Oct. 22, 1963

3,107,741
MACHINES FOR SIMULTANEOUSLY DRILLING
AND INSERTING PIPE LINES
George L. Adams and Charles T. Govin, Salem, Ohio, assignors to The Salem Tool Company, Salem, Ohio, a corporation of Ohio
Filed Mar. 29, 1960, Ser. No. 18,349
4 Claims. (Cl. 175—122)

This invention relates generally to augering machines and more particularly to machines for augering holes and simultaneously placing pipe lines therein.

The principal object of this invention is the provision of an augering unit that drills a hole that has very little drift and forces a pipe, tubing or casing in following the auger cutting head into the ground. The improved accuracy in augering the hole is due to the use of a track that holds and guides the base which in turn supports the carriage that feeds the auger and the culvert into the hole being bored. The track permits the use of a longer culvert tube that once set with the augering cutting head provides continuous bearing surface on the tube as the hole gets deeper.

The boring of holes under roadbeds, streets, railroads and the like is further improved by employing a large boring head followed by one or more large size auger sections extending through the tubing or pipe that is to be placed in the hole and thereafter providing smaller sized auger sections at intervals or between large sized auger sections. This permits a rapid return of the bored material and provides a reservoir which will hold the excess dirt until it is rearwardly or until the auger sections are withdrawn. By doing this one may relieve the duties in removing all of the augered dirt from the trench during the augering operation.

Another object is the provision of a track along which a long section of pipe may be positioned to move into the hole. The pipe being guided at the front end by the track and at its rear end by the augering machine that moves along the track thereby producing an augered hole with very little drift.

Another object is the provision of a track which provides means for locking the frame of the augering machine while the augering tool proceeds to force the auger into the earth.

Another object is the provision for moving the augering frame along the track by retaining or holding the augering machine relative to the track.

Another object is the provision of an augering tool for cutting holes under road or track beds and simultaneously forcing a pipe therein and wherein the augering tool may be driven by a Kelly bar for the purpose of leaving a portion of the augered dirt within the pipe.

Another object is the provision of a push up pipe which is made smaller in diameter than the pipe used to follow the boring hole for the purpose of discharging the material augered before it reaches the vicinity of the augering machine.

Other objects and advantages appear hereinafter in the following description and claims.

The accompanying drawings show for the purpose of exemplification without limiting the claims thereto, certain practical embodiments illustrating the principles of this invention wherein:

FIG. 1 is a view in side elevation showing an angering machine mounted in position to drill a hole.

FIG. 2 is a plan view of the structure shown in FIG. 1.

FIG. 3 is a perspective view showing the augering unit on a portion of the track without the pusher tube.

FIG. 4 is a sectional view taken along the line 4—4 of FIG. 2.

Referring to FIGS. 1 and 2 of the drawings the track as indicated by the rails 1 and 2 is made up of pipe which rests on the cross ties 3 which are inverted channels and their ends are provided with plates 4 which are arcuately cut out to receive the pipes 1 and 2 and hold them in spaced relation. These plates are positioned on each side of the channel tie members 3 and are welded to the pipe. Since the tie member channel and the plates 4 do not extend beyond the large diameter of the pipe forming the track they do not show in full lines in FIG. 2. The track can be made in varying lengths and coupled together by pins adjoining the track ends to extend the same. The top of the track is provided with holes 5 to receive the pins 6 as shown in FIG. 2 for the purpose of locking the auger frame 7 relative to the track. The auger frame is provided at each of its four corners with the hollow stands 8 that receive the vertically adjustable jack members 10, the lower ends of which are provided with the arcutate saddle or shoe 11 that embraces one half of the circumference of the track and has a hole 12 to receive the locking pin 6.

Thus the frame 7 may be adjusted at each of its corners to properly position the auger relative to the ground on which the track is laid.

The track as shown in FIGS. 1 and 2 may be cribbed into the earth as indicated at 13 and 14 to secure this track relative to the trench and permit the frame of the augering machine to work from its connection through the pins 6 to the track.

As shown in FIGS. 1 to 3 the augering frame 7 consists of spaced parallel channels 15 placed on their edge and secured by the upwardly open cross channels 16 with the help of the gusset plates 17, thus making a very rigid frame. This frame being movable on the track formed by the rails 1 and 2 by means of the shoes 11 also has a carriage 18 movable therealong. This carriage is preferably provided with rollers (not shown) to support it in riding along the tops of the parallel channels 15 and supports the motor or prime mover 20 which is usually in the form of some type of internal combustion engine which operates through a transmission 21, a gear reducer 22 and a driving coupler 23 for the purpose of rotating a Kelly bar 24 which is coupled thereto.

The carriage 18 is provided with the side members 25 that are secured thereto and support the carriage pusher ring 26. The whole of the coupling 23 may be enclosed by these members by putting removable cover sections from one side 25 to the other and between the gear reducer 22 and the pusher plate 26 thereon.

The pusher ring 62 is flanged to receive the pusher tube 27 which carries intermediate of its ends bearings such as indicated at 28 for the Kelly bar. The pusher tube itself may ride on a saddle 30 supported from the belly plate that extends between the parallel channel members 15. When the machine 20 is extended to its full extent on the frame 7 the pusher tube lies with its end projecting somewhat beyond the front end of the frame.

The outer end of the pusher tube 27 is provided with an expander member 31 which has a ring 32 to receive the outer end of the pusher tube 27 and also support the radial fingers 33 of which there may be three or more and the outer end of these fingers are secured by a partial ring member 34 which with the ends of the fingers engage the tube 35 that is to be shoved into the hole to be bored by the augering bit or cutter head 36 that projects from the opposite end of the tube. The front of the tube 35 is provided with a guide 39 and at least one or two auger sections 37 that substantially fill the bore of the tube 35. The last auger section 37 may be placed adjacent the end of the Kelly bar 24. However, the intermediate auger sections may be small as indicated at 38 and some of the dirt may be left within the tube 35 until after the outer auger section 37 is withdrawn. The machine can be positioned at the far end of the track adjacent the cribbing 14 and the auger sections can then pile the dirt up in the trench when the tube 35 is within the hole and the augers are withdrawn.

The inner end of the pusher tube 27 may be made fast to the ring 26 and the outer end of the pusher tube 27 in turn is fastened to the ring 32 of the expander member 31. The ring 34 and the ends of the fingers 33 may in turn be detachably secured to the tube 35 so that after the tube has started into the hole the friction thereof is sufficient to permit the hydraulic carriage operator 44, 45 to pull the frame 7 forward on the track after withdrawing the pins 6 under the advance position of the machine until it assumes a position as illustrated in FIG. 1. The pins may again be re-inserted at the holes 5 in the new position or assuming the next stroke in the augering operation which is approximately half the length of the frame 7 as shown in FIG. 1.

As shown in FIG. 2 pulleys 40 may be set in the ground or attached to the track adjacent the forward end of the latter and a dead man positioned at 41 on each side of the track to which the cables 42 are attached, the opposite end of the cable 42 being secured to the carriage as shown at 43. Thus when the carriage has moved to its forward position and the slack in the cables 42 has been removed, then the cables will retain the carriage while the latter through its hydraulic jack draws the frame forward after first removing the pin 6 to slide the frame until it has completely advanced as far as the carriage as shown in FIG. 1.

Ordinarily the tube following the cutter head into the hole will provide a sufficient anchorage to move the frame under the carriage without the use of the cables 42.

In moving the frame 7 relative to the track the carriage is provided with a cylinder 44 and a piston 45 which is connected with the frame 7 as indicated at 46. The piston 45 has a double acting piston within the cylinder 44 and thus provides power on either stroke which permits the augering engine to be moved forwardly to auger and bore the hole or to draw the frame back up under the machine to the position as shown in FIGS. 1 and 2.

The long track through the shoes 11 provides an accurate guide for the rear end of the tube 35. The front end of the tube 35 is guided by the guide member 39 that actually supports the tube on the track. This guide 39 may be adjustably positioned along the track and will function at most any position depending upon the length of the tube 35. However, it is preferable to have it adjacent the wall face into which the hole is to be bored. The long section of track together with the guiding of the long integral tube 35 produces a hole with very little drift which when completed is lined with the tube 35. It is possible to push the tube out of the hole after it is bored but ordinarily it is desired to have the tube remain in the hole after it is bored.

We claim:

1. A pipe line drill including an elongated base, a carriage mounted for movement longitudinally on said base, power means connected between said carriage and said base to provide relative movement between said base and said carriage, a rotary drive mounted on said carriage, auger means connected to said rotary drive and extending forwardly of said carriage, a cutting head mounted on the forward end of said auger means, a pipe pushing means on the forward end of said carriage, a saddle on said base to slidably support said pipe pushing means, a pipe having one end connected to and supported by said pipe pushing means and to be inserted and left in the drilled hole and surrounding said auger means behind said cutting head, a portion of said auger means being substantially the same diameter as the bore of said pipe, a track materially longer than said base for supporting said base for movement therealong, means to detachably lock said base relative to said track and hold said base while operating said power means to move said carriage along said base to feed said cutting head to bore the hole and simultaneously shove said pipe into the hole, and to release said base from said track for retracting said base back under said carriage by said power means when said lock means is detached from between said base and said track to extend said auger means and pipe.

2. The pipe line drill of claim 1 characterized by a guide support on the forward end of said track to support said pipe closely adjacent the hole to be drilled.

3. The pipe line drill of claim 1 characterized in that said pipe pushing means includes an extension in the form of a tube smaller in diameter than said pipe, and an adaptor connected between said tube and said pipe, said extension being open to discharge material from said pipe in front of said base.

4. The pipe line drill of claim 3 characterized in that said adaptor comprises a plurality of annularly spaced arms detachably secured to the end of the pipe to provide discharge openings for the borings to discharge therefrom.

References Cited in the file of this patent

UNITED STATES PATENTS

| 1,604,896 | Foltz | Oct. 26, 1926 |
| 1,699,936 | Watchorn | Jan. 22, 1929 |
| 1,835,191 | Tilly | Dec. 8, 1931 |
| 1,993,366 | Englebright | Mar. 5, 1935 |
| 2,165,666 | Tilly | July 11, 1939 |
| 2,294,318 | Rich | Aug. 25, 1942 |
| 2,338,351 | Parrish | Jan. 4, 1944 |
| 2,588,068 | Williams et al. | Mar. 4, 1952 |
| 2,798,707 | Kandle | July 9, 1957 |
| 2,839,271 | Kandle | June 17, 1958 |

FOREIGN PATENTS

| 826,896 | Germany | Jan. 7, 1952 |